United States Patent [19]
Kim

[11] Patent Number: 5,793,436
[45] Date of Patent: Aug. 11, 1998

[54] BUFFER OCCUPANCY CONTROL METHOD FOR USE IN VIDEO BUFFERING VERIFIER

[75] Inventor: Seong-bong Kim, Seoul, Rep. of Korea

[73] Assignee: Samsung Electronics Co., Ltd., Kyungki-do, Rep. of Korea

[21] Appl. No.: 665,522

[22] Filed: Jun. 17, 1996

[51] Int. Cl.$^6$ ............................................ H04N 7/00
[52] U.S. Cl. ................................. 348/497; 348/457
[58] Field of Search ............................. 348/497, 459, 348/500, 501, 518, 714, 470, 495

[56] References Cited

U.S. PATENT DOCUMENTS 5,461,420  10/1995  Yonemitsu et al. .................. 348/401
5,565,924  10/1996  Haskell et al. ........................ 348/423
5,652,627  7/1997   Allen ..................................... 348/497

*Primary Examiner*—Victor R. Kostak
*Attorney, Agent, or Firm*—Sughrue, Mion, Zinn, Macpeak & Seas, PLLC

[57] ABSTRACT

A buffer occupancy control method is provided in order to properly control a buffer occupancy of a decoder. The intial time delay indicated in data received by the buffer is extended and the capacity of the buffer is expanded according to the additional amount of data inserted during the extended initial time delay, thereby preventing the buffer from overflowing and underflowing. In particular, when a bitstream encoded with a frame rate of 24 Hz is decoded according to a display field frequency of 60 Hz, excellent images can be regenerated without requiring additional components.

11 Claims, 1 Drawing Sheet

BUFFER OCCUPANCY CONTROL METHOD FOR USE IN VIDEO BUFFERING VERIFIER

BACKGROUND OF THE INVENTION

1. Field of the Invention

The present invention relates to a buffer occupancy control method of a decoder, and more particularly, to a buffer occupancy method for use in a video buffering verifier when a video sequence is decoded according to a 3:2 pull-down technique.

2. Background of the Related Art

The standard encoding technique proposed by the Moving Pictures Experts Group (MPEG) uses a variable length coding method. Accordingly, the amount of the data output from an encoder of a transmitter varies according to a change in a scene or the magnitude of motion in an image input from an external information source. Therefore, it is required that the occupancy of a buffer, which stores a received signal, is appropriately controlled. For this purpose, a video buffering verifier is used.

The video buffering verifier is a hypothetical decoder which is conceptually connected to the output of an encoder. The video buffering verifier and the video encoder have the same clock frequency as well as the same frame rate, and operate synchronously. The video buffering verifier has a receiving buffer which is initially empty. After filling the receiving buffer with all data that precedes a first picture start code of a video sequence and the picture start code itself, the receiving buffer is filled with data from the bitstream of the video sequence during a specified initial delay time interval VBV_DELAY. The initial delay time interval is specified in each picture header.

When a video sequence bitstream, which is encoded with a frame rate of 24 Hz, is decoded, a video buffering verifier uses a 24 Hz sync signal so that the received bitstream can be decoded without causing underflow or overflow of the internal receiving buffer (hereinafter referred to as a VBV buffer). The buffer occupancy for the video sequence bitstream encoded with a 24 Hz frame rate is shown in FIG. 1, in which $t_n$ is the time when the n-th coded picture is removed from the VBV buffer and is measured in units of seconds. $D_n$ is the picture data of the n-th coded picture and is measured in units of bits, where n is 0, 1, 2, 3, . . . The initial delay time interval VBV_DELAY is defined according to the following equation (1).

$$VBV\_DELAY_n = (B_n/R) \times 90,000 (n=1, 2, 3, 4, \ldots) \quad (1)$$

Here, $B_n$ is the buffer occupancy just after the n-th coded picture has been removed from the VBV buffer, which is measured in units of bits, and R is the transmission bit rate. The VBV buffer stores the received data for a period of time corresponding to the initial delay time interval VBV_DELAY, then outputs some of the data stored up until the time $t_1$ and performs an actual decoding operation. Using the video buffering verifier, the decoder can decode the received data without the VBV buffer underflowing or overflowing, with respect to the received data, thereby providing an excellent quality image.

However, when a 3:2 pull-down technique is applied to an encoded video sequence having a frame rate of 24 Hz, an overflow or underflow condition occurs in the existing VBV buffer, thereby making it difficult to obtain an image having excellent quality. The 3:2 pull-down technique obtains a decoded video sequence having a frame rate of 60 Hz from an encoded video sequence having a frame rate of 24 Hz. That is, five decoded image frames are obtained using two encoded image frames. When the 3:2 pull-down technique is used and if a channel is altered and a power-on switch is turned on, a VBV buffer overflow or underflow condition occurs in the existing video buffering verifier. As a result, an image displayed on a screen exhibits a sudden jerkiness phenomenon, thereby lowering the picture quality.

SUMMARY OF THE INVENTION

To solve the above problem, it is an object of the present invention to provide a buffer occupancy control method which can prevent an underflow or overflow of a VBV buffer when a video sequence bitstream encoded with a frame rate of 24 Hz is decoded according to a field frequency of 60 Hz and the decoded result is displayed using a 3:2 pull-down technique.

To accomplish the above object of the present invention, there is provided a buffer occupancy control method for use in a video buffering verifier in order to control a buffer occupancy in an internal VBV buffer for decoding, using a 3:2 pull-down technique, the buffer occupancy control method comprising the steps of:

(a) delaying an initial delay time interval for storing received data in the VBV buffer by a predetermined interval of time to prevent the VBV buffer from occurrence of an underflow at the time of performing a channel alteration or a power-on; and (b) expanding a buffer capacity of the VBV buffer to prevent the VBV buffer from occurrence of an overflow.

BRIEF DESCRIPTION OF THE DRAWINGS

The preferred embodiments are described with reference to the accompanying drawings, wherein.

DETAILED DESCRIPTION OF THE PREFERRED EMBODIMENT

A preferred embodiment of the present invention is described below in more detail with reference to the accompanying drawings.

Figure 2:
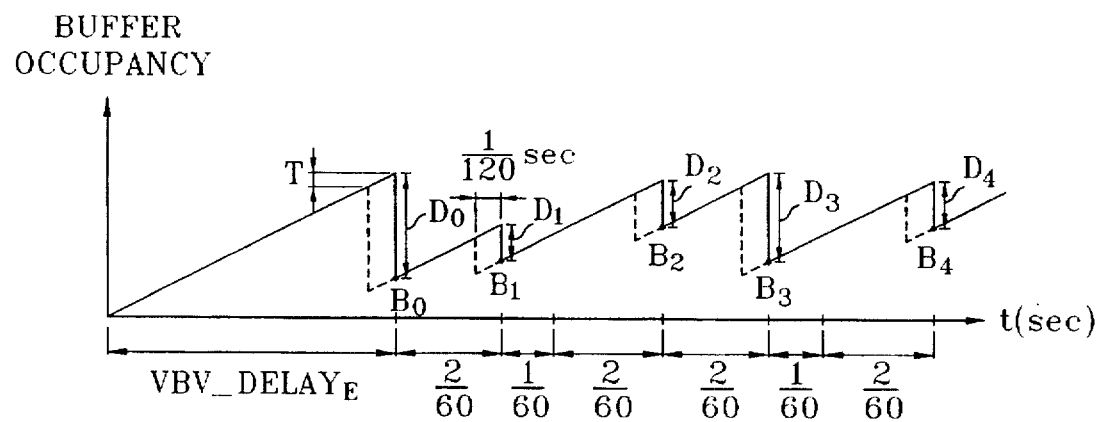
FIG. 2 is a conceptual graph for explaining a buffer occupancy control method for use in a video buffering verifier according to the present invention.

FIG. 2 shows a conceptual graph for explaining a buffer occupancy control method for use in a video buffering verifier according to a preferred embodiment of the present invention. The present invention relates to a buffer occupancy control method in which images, such as an I-picture and a P-picture, do not require reordering.

Figure 1:
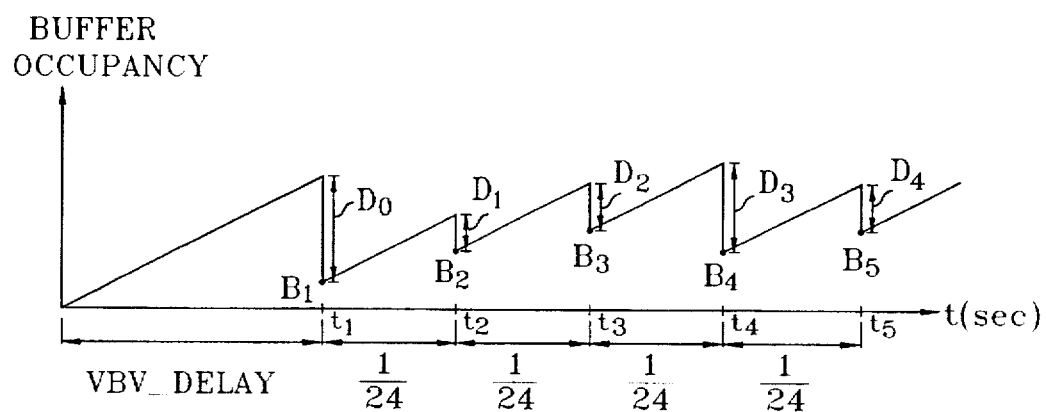
FIG. 1 is a conceptual graph for explaining a buffer occupancy control method for use in an existing video buffering verifier.

In FIG. 2, an interval of time from the origin to the left-most vertical dotted line is an initial delay time interval VBV_DELAY identical to that shown in FIG. 1 which is determined according to the known method, while an interval of time from the origin to the left-most vertical solid line is an initial delay time interval $VBV\_DELAY_E$ which is prolonged from VBV-DELAY according to the present invention. Data amounts expressed by the dotted lines shown in FIG. 2 are the same, as that for the corresponding times of FIG. 1. Also, $D_n$ is same as that shown in FIG. 1, where n is 0, 1, 2, 3, . . . .

When the 3:2 pull-down technique is used, and if a channel alteration or a power-on operation is performed, an existing decoding operation starts after the received data fills the VBV buffer during an initial delay time interval VBV_DELAY, which is specified in the first image header next to the sequence header. The decoding operation is performed for 2/60th of a second on a quantity of the encoded data $D_0$ and is not performed for the next 1/60th of a second. That is, the first image frame is displayed during the first 2/60th of a second shown in FIG. 2, and the first field of the first image frame is displayed once again during the successive 1/60th of a second. Then, the second image frame is displayed during the second 2/60th of a second interval, and then the third image frame is displayed during the third 2/60th of a second interval. Next, the first field of the third image frame is displayed once again during a successive 1/60th of a second interval.

Meanwhile, if an output control operation is performed on the VBV buffer using a frequency of 60 Hz after inputting the received data into the VBV buffer only during the initial delay time interval VBV_DELAY shown in FIG. 1, the probability of an underflow condition occurring in the VBV buffer is high. To solve this problem, the video buffering verifier employed in the present invention uses a new initial delay time interval $VBV\_DELAY_E$ obtained by prolonging the existing initial delay time interval VBV_DELAY when a channel alteration or a power-on operation is performed. Therefore, in the case of a system using a 750-system clock of 90 kHz, the video buffering verifier stores more received data in the VBV buffer during the initial delay time interval $VBV\_DELAY_E$ which is prolonged over an existing initial delay time interval VBV_DELAY by 1/120th of a second. This prolonged time interval of 1/120th of a second is obtained by dividing 90 KHz into 750 clock pulses for the case of a decoding system which uses the 750-system clock. A quantity of additional data T which is additionally stored in the VBV buffer for this 1/120th of a second is calculated according to the following equation (2).

$$T=(\text{system clock})\times(\text{bit quantity input at fixed rate for }1/120\text{ seconds}) \quad (2)$$

The case in which data is additionally stored in the VBV buffer according to the present invention is compared below with the known case. The quantity of received data stored in the VBV buffer for the existing initial delay time interval VBV_DELAY is smaller by an amount "T", shown in FIG. 2, than that stored in the VBV buffer for the initial delay time interval $VBV\_DELAY_E$ according to the present invention. Therefore, using the prolonged initial delay time interval $VBV\_DELAY_E$ according to the present invention, an underflow phenomenon is largely reduced compared with the known VBV buffer.

Meanwhile, the VBV buffer using the prolonged initial delay time interval $VBV\_DELAY_E$ can produce an overflow due to the additional stored data. To solve this problem, the capacity of the known VBV buffer is preferably expanded by an appropriate amount. The capacity of the VBV buffer adapted for use with the prolonged initial delay time interval $VBV\_DELAY_E$ is calculated according to the following equation (3), where f is the expanded buffer capacity and R is the transmission bit rate.

$$f=R\times(1/120\text{th of a second}) \quad (3)$$

The buffer capacity expanded according to equation (3) is commensurate with the increased bit quantity T added to the VBV buffer according to equation (2). Accordingly, the excessive portion of the buffer capacity due to the addition of the bits used to store the bits received during the extended time period. As a result, the buffer has additional space according to the expansion f of the buffer capacity to prevent an overflow condition from occurring due to the above-described receipt of additional bits. Thus, although a video signal having a frame rate of 24 Hz is decoded to have a frame rate of 60 Hz, the buffer cannot underflow or overflow.

As described above, the present invention properly readjusts the data storage capacity and the initial delay time interval for the VBV buffer in the video buffering verifier. Accordingly, the received data can be processed without an overflow or underflow condition occurring in the VBV buffer even though the 3:2 pull-down technique is used for decoding. This invention is more useful when a bitstream encoded with the frame rate of 24 Hz is decoded according to the field frequency of 60 Hz used for display.

While only certain embodiments of the invention have been specifically described herein, it will be apparent that numerous modifications may be made thereto without departing from the spirit and scope of the invention.

What is claimed is:

1. A buffer occupancy control method for use with an internal video buffering verifier (VBV) for controlling occupancy of a VBV buffer for decoding in which the VBV buffer receives data including an indicator of an initial time delay to be employed by the VBV buffer, the method comprising the steps of:

(a) extending the initial delay time interval by a predetermined amount of time to prevent the VBV buffer from underflowing, wherein the predetermined amount of time is one clock pulse interval of a system clock; and (b) storing the received data in the VBV buffer during the extended initial delay time interval, wherein the VBV buffer has a capacity substantially equal to an amount of data to be received during the extended initial delay time interval to prevent the VBV buffer from overflowing.

2. The buffer occupancy control method according to claim 1, wherein underflow of the VBV buffer is prevented from occurring in step (a) during a channel alteration or power-on operation.

3. The buffer occupancy control method according to claim 1, wherein said step (a) comprises the step of determining the extended delay time interval based on a system clock.

4. The buffer occupancy control method according to claim 3, wherein the extended delay time interval is 1/120 seconds when video data encoded with a frame rate of 24 Hz is received by the VBV buffer and decoded according to a field frequency of 60 Hz.

5. The buffer occupancy control method according to claim 1, wherein an additional amount of data (T) is received by the VBV buffer during the extended intial time delay over the amount of data received during the time interval corresponding to the initial time delay interval indicated in the received data, in which (T) is calculated based on a system clock and according to the following equation, $$T=(\text{system clock rate})\times(\text{bit quantity of the received data input at a fixed rate for }1/120\text{ seconds}).$$

6. The buffer occupancy control method according to claim 1, wherein the data stored in step (b) is stored in the VBV buffer having an expanded buffer capacity, wherein the expanded buffer capacity of the VBV buffer is calculated according to the following equation, expanded buffer capacity=(transmission bit rate)×(1/120 seconds).

7. The buffer occupancy control method according to claim 5, wherein underflow of the VBV buffer is prevented from occurring in step (a) during a channel alteration or power-on operation.

8. The buffer occupancy control method according to claim 5, wherein the extended delay time interval is 1/120 seconds when video data encoded with a frame rate of +e,fra 24+ee Hz is received by the VBV buffer and decoded according to a field frequency of 60 Hz.

9. The buffer occupancy control method according to claim 6, wherein underflow of the VBV buffer is prevented from occurring in step (a) during a channel alteration or power-on operation.

10. The buffer occupancy control method according to claim 6, wherein said step (a) comprises the step of determining the extended delay time interval based on a system clock.

11. The buffer occupancy control method according to claim 10, wherein the extended delay time interval is 1/120 seconds when video data encoded with a frame rate of 24 Hz is received by the VBV buffer and decoded according to a field frequency of 60 Hz.

* * * * *